United States Patent
Binder et al.

(10) Patent No.: US 10,318,953 B2
(45) Date of Patent: Jun. 11, 2019

(54) NEAR FIELD COMMUNICATION FLEX CIRCUIT

(71) Applicant: Square, Inc., San Francisco, CA (US)

(72) Inventors: Jason Binder, San Francisco, CA (US); Jeremy Wade, San Francisco, CA (US)

(73) Assignee: Square, Inc., San Francisco, CA (US)

( * ) Notice: Subject to any disclaimer, the term of this patent is extended or adjusted under 35 U.S.C. 154(b) by 456 days.

(21) Appl. No.: 15/197,720

(22) Filed: Jun. 29, 2016

(65) Prior Publication Data

US 2018/0005224 A1    Jan. 4, 2018

(51) Int. Cl.
| | |
|---|---|
| *H04B 1/40* | (2015.01) |
| *H04B 5/02* | (2006.01) |
| *H04W 4/021* | (2018.01) |
| *G06Q 20/32* | (2012.01) |
| *H04B 5/00* | (2006.01) |
| *G06K 7/00* | (2006.01) |
| *H04W 4/80* | (2018.01) |

(52) U.S. Cl.
CPC ....... *G06Q 20/3278* (2013.01); *G06K 7/0008* (2013.01); *H04B 5/0031* (2013.01); *H04B 5/0075* (2013.01); *H04B 5/02* (2013.01); *H04W 4/80* (2018.02)

(58) Field of Classification Search
CPC ........ G06Q 20/3278; H04B 1/40; H04B 1/59; H04B 5/0031; H04B 5/0075; H04B 5/02; H04W 4/021
See application file for complete search history.

(56) References Cited

U.S. PATENT DOCUMENTS

| | | |
|---|---|---|
| 8,797,877 B1 | 8/2014 | Perla et al. |
| 9,264,889 B2 | 2/2016 | Choi-Grogan et al. |

(Continued)

FOREIGN PATENT DOCUMENTS

| | | | |
|---|---|---|---|
| EP | 1260947 A1 * | 11/2002 | .......... G06Q 20/341 |
| WO | 2017/214349 A1 | 12/2017 | |
| WO | 2018/005468 A1 | 1/2018 | |

OTHER PUBLICATIONS

"FLEX-M24LR04E 45 mm x 75 mm flexible antenna reference board for the M24LR04E-R Dual Interface EEPROM," St Microelectronics, published Jul. 2, 2012, pp. 1-3.

(Continued)

*Primary Examiner* — Blane J Jackson
(74) *Attorney, Agent, or Firm* — Maynard Cooper & Gale, P.C.; Brian T. Sattizahn, Esq.

(57) ABSTRACT

A payment terminal can have a near field communication (NFC) circuit to permit the payment terminal to accept an NFC payment transaction from a payment device of a customer. The NFC circuit can have a first set of components that are located on a printed circuit board in the base of the payment terminal and a second set of components that are mounted on a flex circuit in another region of the payment terminal. The flex circuit can be coupled to the printed circuit board and have an extended portion with a plurality of traces to communicate transmit and receive data between the first set of components and the second set of components. The plurality of traces on the extended portion can have a predetermined length that is greater than or equal to 2.5% of the propagation-medium-specific wavelength of the carrier signal communicated over the traces.

28 Claims, 9 Drawing Sheets

(56) References Cited

U.S. PATENT DOCUMENTS

| | | | |
|---|---|---|---|
| 9,489,496 | B2 | 11/2016 | Wysocki et al. |
| 9,916,737 | B2 | 3/2018 | Osmon et al. |
| 2003/0076263 | A1 | 4/2003 | Hassan-Zade et al. |
| 2007/0051809 | A1 | 3/2007 | Takahashi et al. |
| 2007/0121507 | A1 | 5/2007 | Manzalini et al. |
| 2011/0110381 | A1 | 5/2011 | Atkinson et al. |
| 2012/0094599 | A1 | 4/2012 | Takeyama |
| 2014/0148095 | A1 | 5/2014 | Smith et al. |
| 2014/0150056 | A1 | 5/2014 | Williams et al. |
| 2014/0375481 | A1 | 12/2014 | McNicoll |
| 2015/0048163 | A1* | 2/2015 | Senior ............... G06K 7/10336 235/439 |
| 2015/0235204 | A1* | 8/2015 | Wallner ............... G06Q 20/322 705/39 |
| 2015/0303994 | A1 | 10/2015 | Dhayni |
| 2015/0339649 | A1 | 11/2015 | Pi Farias |
| 2016/0006123 | A1 | 1/2016 | Li et al. |
| 2016/0182127 | A1 | 6/2016 | Karandikar et al. |
| 2016/0306616 | A1 | 10/2016 | Tomppo |
| 2017/0357961 | A1 | 12/2017 | Bidari et al. |
| 2018/0063004 | A1 | 3/2018 | Uppunda et al. |

OTHER PUBLICATIONS

International Search Report and Written Opinion for International Application No. PCT/US2017/039466, dated Oct. 5, 2017.
Brinkmann, M., "Windows 10 Update Delivery Optimization explained," Windows, dated Aug. 17, 2016, Retrieved from the Internet URL: https://web.archive.org/web/20161110094241/https://www.ghacks.net/2016/08/17/windows-10-update-delivery-optimization/, pp. 1-6.
Negron, J., "[Technical Blueprint] Windows 10 Co-Management with SCCM & Workspace ONE," VMware End-User Computing Blog, dated Apr. 16, 2018, Retrieved from the Internet URL: http://aponewsletter.blogspot.com/2018/04/technical-blueprint-windows-10-co.html, pp. 1-9.
"Software Update Server," Technology Brief, Retrieved from the Internet URL: https://www.apple.com/server/docs/Software_Update_Server_TB_v10.4.pdf, pp. 1-3 (Jun. 16, 2005).
Non-Final Office Action dated Mar. 29, 2018, for U.S. Appl. No. 15/248,071, of Uppunda, K.K.K., et al., filed Aug. 26, 2016.
Non-Final Office Action dated Apr. 19, 2018, for U.S. Appl. No. 15/176,589, of Bidari, E., et al., filed Jun. 8, 2016.
Non-Final Office Action dated Jul. 25, 2018, for U.S. Appl. No. 15/636,356, of Kelley, J., et al., filed Jun. 28, 2017.
International Search Report and Written Opinion for International Application No. PCT/US2016/050036, dated Nov. 29, 2016.
Search Report and Written Opinion for International Application No. PCT/US2017/036473, dated Oct. 13, 2017.
International Search Report and Written Opinion for International Application No. PCT/US2018/034773, dated Aug. 10, 2018.
Final Office Action dated Oct. 25, 2018, for U.S. Appl. No. 15/176,589, of of Bidari, E., et al., filed Jun. 8, 2016.
Final Office Action dated Nov. 5, 2018, for U.S. Appl. No. 15/248,071, of Uppunda, K.K.K., et al., filed Aug. 26, 2016.
Final Office Action dated Jan. 4, 2019, for U.S. Appl. No. 15/636,356, of Kelley, J., et al., filed Jun. 28, 2017.
Advisory Action dated Jan. 7, 2019, for U.S. Appl. No. 15/176,589, of Bidari, E., et al., filed Jun. 8, 2016.

* cited by examiner

NEAR FIELD COMMUNICATION FLEX CIRCUIT

BACKGROUND

Near field communication ("NFC") devices are capable of communicating when they are placed in close proximity to each other, and may be used for transactions such as payment transactions. Each of the NFC communication devices includes an antenna and related circuitry such as a matching circuit. A first NFC communication device generates a wireless carrier signal at a suitable frequency such as 13.56 MHz and transmits that signal over its antenna. When the antenna of a second NFC communication device is placed in close proximity to the antenna of the first NFC communication device, the two devices become inductively coupled, such that energy is coupled between the two devices through a shared magnetic field.

When the two NFC communication devices are inductively coupled, either of the NFC communication devices may communicate via modulated versions of the wireless carrier signal. The first NFC communication device may modify aspects of the wireless carrier signal such as amplitude, frequency, and phase prior to transmission in order to encode data that is transmitted to the second NFC communication device. During times that the first device is not transmitting, the second NFC communication device may encode data that is transmitted to the first NFC communication device. The second NFC communication device modifies the inductively coupled signal using techniques such as active or passive load modulation. The first NFC communication device receives the encoded data based on the changes to the inductively coupled signal.

The use of NFC for payment transactions requires the antenna of the customer's NFC-capable payment device to be placed in close proximity to the antenna of the merchant's NFC-capable payment terminal in order to inductively couple the NFC communication devices for the exchange data between the two NFC communication devices. For the convenience of the customer, the merchant may want to place the antenna of the NFC communication device in a display area of the payment terminal for easier accessibility by the customer's payment device. However, the display area may not have adequate space for all of the components of the NFC communication device thereby requiring the NFC communication device to be placed in a location of the payment terminal that is more difficult for the customer to access.

BRIEF DESCRIPTION OF THE DRAWINGS

The above and other features of the present disclosure, its nature and various advantages will be more apparent upon consideration of the following detailed description, taken in conjunction with the accompanying drawings in which.

DETAILED DESCRIPTION

A payment terminal can have a near field communication (NFC) circuit to permit the payment terminal to accept an NFC payment transaction from a payment device of a customer. The NFC circuit can have a first set of components that are mounted on a printed circuit board in the base of the payment terminal and a second set of components that are mounted on a flex circuit in another region of the payment terminal. An extended portion of the flex circuit can be coupled to the printed circuit board. The extended portion of the flex circuit can have a plurality of traces to communicate, transmit and receive data between the first set of components and the second set of components of the NFC circuit. The extended portion of the flex circuit can have a predetermined length that is greater than or equal to 2.5% of the propagation-medium-specific wavelength of the frequency of the carrier signal communicated over the traces on the extended portion of the flex circuit.

The first set of components on the printed circuit board can include an NFC transceiver to generate an outgoing modulated digital signal to be transmitted to the customer based on a payment message. The generated payment message from the NFC transceiver can be a differential, amplitude modulated digital signal that is passed through a pair of inverters to boost the signal for communication over the extended portion of the flex circuit. The first set of components may also include, within the receive signal path, amplifier and comparator circuits to process the data from an analog data signal based on modulation of the NFC antenna load by a customer payment device. The processed analog signal may be provided to the NFC transceiver.

The second set of components on the flex circuit can include a power amplifier to receive the modulated digital signal from the NFC transceiver and amplify and convert the modulated digital signal to a differential analog signal, and a tuning circuit to prepare the differential analog signal for transmission by an NFC antenna. The power amplifier can include a termination circuit to receive the modulated digital signal from the NFC transceiver. The termination circuit can be used for impedance matching of the traces of the extended portion of the flex circuit to minimize or remove transmission line effects that could occur on the traces. The receive path of the second set of components may include rectifier/filtering circuits to remove the carrier signal from a signal received from the customer via the NFC antenna and an amplifier circuit to communicate the data from the received signal to the amplifier circuit of the first set of components.

Figure 1:
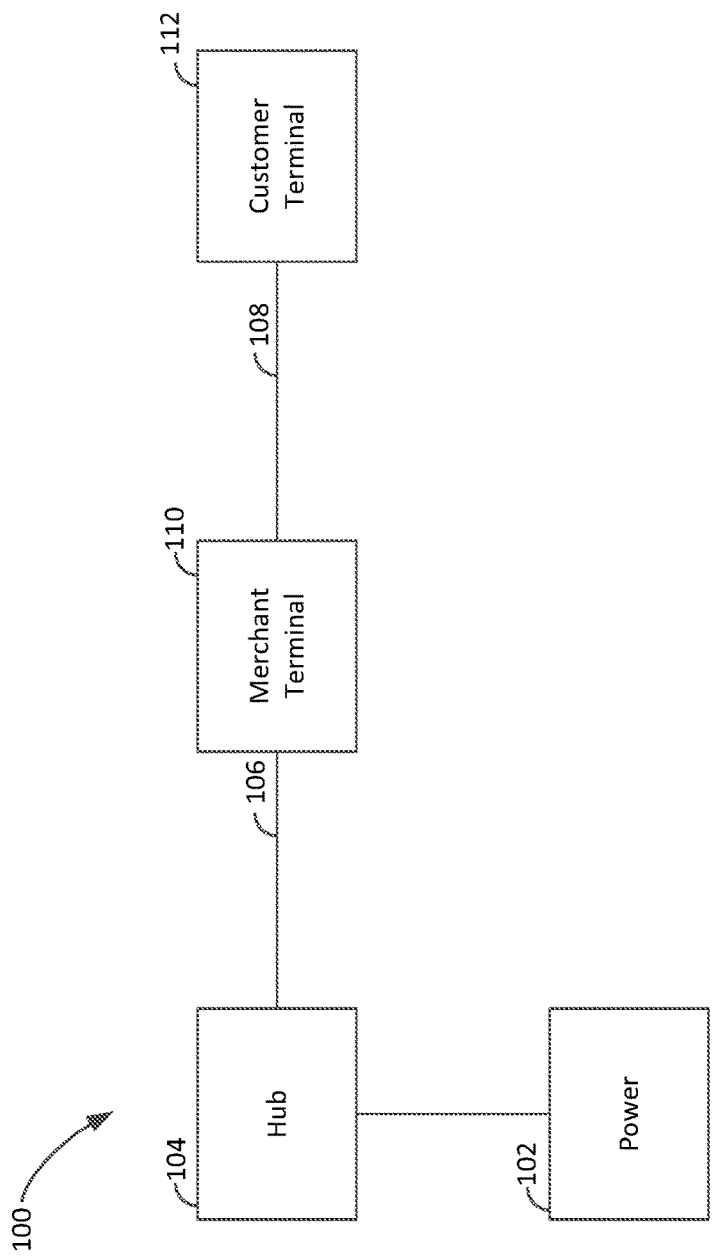
FIG. 1 depicts an illustrative block diagram a power supply, USB hub, merchant terminal and customer terminal of a point-of-sale system in accordance with some embodiments of the present disclosure.

FIG. 1 depicts an illustrative block diagram of a payment system 100 in accordance with some embodiments of the present disclosure. In one embodiment, payment system 100 includes a power supply 102, USB hub 104, USB connector 106, USB connector 108, merchant terminal 110, and customer terminal 112. These components of point-of-sale system 100 facilitate electronic payment transactions between a merchant and a customer.

In an embodiment, the power supply 102 may connect to an AC power source and convert the AC voltage into a DC voltage for use by the components of the payment system 100. A DC voltage (e.g., 12 volts) may be provided to the USB hub 104. USB hub 104 may convert the received DC voltage into a plurality of DC voltages for use in powering circuitry of the USB hub 104. The USB hub 104 allows for the merchant terminal 110 to communicate with a plurality of other USB peripherals, such as a receipt printer, cash drawer, barcode scanner, scale, keyboard, USB-Ethernet dongle/USB MiFi, and other similar peripheral devices. As described herein, the USB hub 104 may also include power supply circuitry that selectively allows the USB hub to provide a power supply signal (e.g., a 12V signal) to merchant terminal 110 via USB connector 106, and via power supply circuitry of merchant terminal 110 and USB connector 108, to customer terminal 112.

The electronic interactions between the merchant and the customer may take place between the merchant terminal 110 and the customer terminal 112. In one embodiment, the merchant terminal 110 supports an interactive computing device that is capable of processing payment information (e.g., encrypted payment card data and user authentication data) and transaction information (e.g., purchase amount and point-of-purchase information) with the customer terminal 112 and a remote payment server (not depicted). The merchant terminal 110 may include a plurality of interfaces as described herein in order to receive and provide power, to communicate with the customer terminal 112 and other devices such as a remote payment server, and to physically interface with other components such as the customer terminal 112. The interactive computing device of the merchant terminal 110 may execute the software instructions of a point-of-sale application to manage user interactions with a merchant, communications with the customer terminal 112, and communications with remote payment servers. The merchant is provided an interface through which the merchant can enter selections of purchased items, access customer information (e.g., loyalty information), check inventory, calculate taxes and fees, and otherwise perform necessary customer service and transaction steps.

The customer terminal 112 may operate as a payment terminal that receives payment information from a customer, and may provide a variety of interfaces to interact with the merchant terminal 110 and a customer. A user interface of the customer terminal 112 may allow the user to interact with the customer terminal 112 in order to interact with the merchant (e.g., select items for purchase, answer queries, confirm purchases, provide PINs and signatures, etc.), receive payment information (e.g., from a swipe card, chip card, or NFC-enabled payment device) from a customer, communicate with the merchant terminal 110 (e.g., via USB connector 108), receive power from merchant terminal 110 (e.g., via USB connector 108), and physically attach to the merchant terminal 110 (e.g., via connecting enclosures of each of the customer terminal 112 and the merchant terminal 110).

Figure 2:
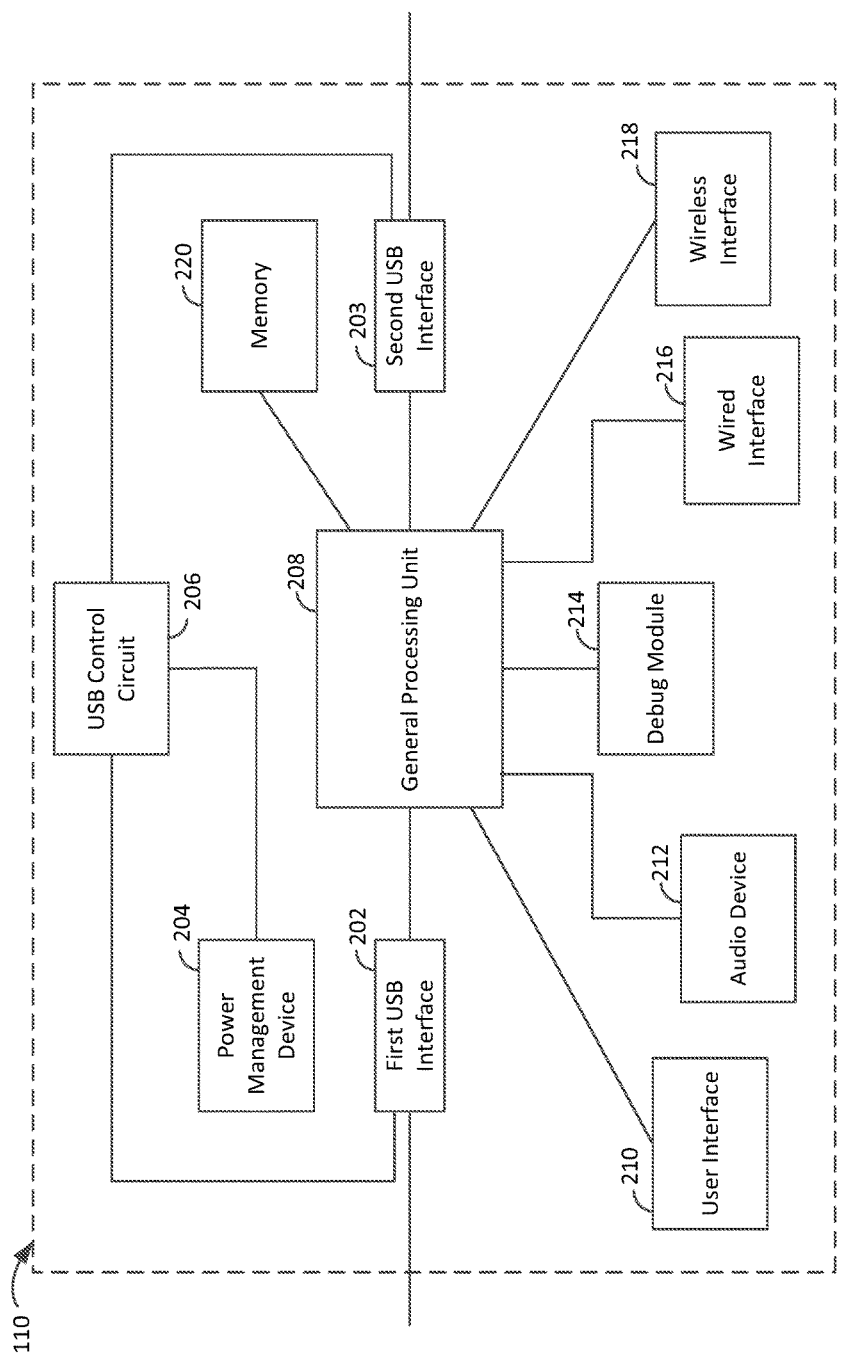
FIG. 2 depicts an illustrative block diagram of components of the merchant terminal in accordance with some embodiments of the present disclosure.

FIG. 2 depicts a block diagram of an example merchant terminal 110 in accordance with some embodiments of the present disclosure. Although particular components are depicted in a particular arrangement in FIG. 2, it will be understood that merchant terminal 110 may include additional components, one or more of the components depicted in FIG. 2 may not be included in merchant terminal 110, and the components of merchant terminal 110 may be rearranged in any suitable manner. Although it will be understood that merchant terminal 110 of point-of-sale system 100 may be implemented in any suitable manner, in one embodiment the merchant terminal 110 may comprise a first USB interface 202, a second USB interface 203, a power management device 204, a USB control circuit 206, a processing unit 208, a user interface 210, an audio device 212, a debug module 214, a wired interface 216, a wireless interface 218, and a memory 220.

Processing unit 208 of merchant terminal 110 may include a processor capable of performing the processing functions of the merchant terminal 110 as described herein, and may be embodied by any suitable hardware, software, memory, and circuitry as is necessary to perform those functions. Processing unit 208 may include any suitable number of processors, and may perform the operations of merchant terminal 110 based on instructions in any suitable number of memories and memory types. In an example embodiment, the processing unit 208 may be a System-on-Chip (SoC) processer having a dual-core processor (e.g., a Dual core ARM Cortex A7/A9).

Processing unit 208 may execute instructions stored in memory 220 of merchant terminal 110 to control the operations and processing of merchant terminal 110, and memory 220 may also store information necessary for the operation of merchant terminal 110. As used herein, memory may refer to any suitable tangible or non-transitory storage medium. Examples of tangible (or non-transitory) storage medium include disks, thumb drives, and memory, etc., but does not include propagated signals. Tangible computer readable storage medium include volatile and non-volatile, removable and non-removable media, such as computer readable instructions, data structures, program modules or other data. Examples of such media include RAM, ROM, EPROM, EEPROM, SRAM, flash memory, disks or optical storage, magnetic storage, or any other non-transitory medium that stores information that is accessed by a processor or computing device. In an example embodiment, memory 220 may include a flash memory and a RAM memory (e.g., a 16 GB eMMC NAND flash and a 2 GB LPDDR3 RAM).

First USB interface 202 and second USB interface 203 may provide for connection of other devices or components to the merchant terminal 110 as appropriate. Although any type of USB connector and interface may be used in accordance with the present disclosure, in an embodiment each of first USB interface 202 and second USB interface 203 may be a USB type B receptacle for interfacing with a type B connector of a USB connector (e.g., USB connector 106 or 108, for connecting to USB hub 104 or customer terminal 112). As will be described herein, in an embodiment first USB interface 202 and second USB interface 203 may be interchangeable, such that merchant terminal 110 may function in an identical manner regardless of which of the USB interfaces is coupled to USB hub 104 or customer terminal 112. In some embodiments (not depicted in FIG. 2), the merchant terminal 110 may include additional interfaces, such additional USB ports, Lightning, Firewire, Ethernet, etc.

Although power may be provided to merchant terminal 110 in any suitable manner, in an embodiment, DC power may be provided from USB hub 104 when it is connected to the merchant terminal via first USB interface 202 or second USB interface 203. A USB control circuit 206 may include circuitry for interacting with the USB hub 104 to receive the incoming DC power signal and to distribute that signal to other components of the merchant terminal 110 (e.g., via power management device 204) and to the customer terminal 112 (e.g., via the other USB interface of first USB interface 202 and second USB interface 203). A power management device 204 (e.g., a discrete power management integrated circuit) may receive power provided from USB hub 104 through one of the USB interfaces (first USB interface 202 or second USB interface 203) and USB control circuit 206, and may perform functions related to power requirements of a host system (e.g., DC to DC conversion, battery charging, linear regulation, power sequencing and other miscellaneous system power functions).

Merchant terminal 110 may also include a user interface 210. User interface 210 may provide various interfaces and outputs to the merchant terminal 110 to be viewed by a merchant. An example user interface 210 may include hardware and software for interacting with a user, such as a touchscreen interface, voice command interface, keyboard, mouse, gesture recognition, any other suitable user interface, or any combination thereof. In one embodiment, the user interface 210 may be a touchscreen interface that displays an interactive user interface for programs and applications such as a point-of-sale application running on the merchant terminal 110.

Merchant terminal 110 may also include an audio device 212. Audio device 212 may provide audio for the merchant terminal 110. An example audio device 210 may comprise an audio amplifier and a speaker for providing appropriate audio for the merchant terminal 110.

Merchant terminal 110 may also include a debug module 214. In an embodiment, a debug module may provide an interface and processing for performing debug operations (e.g., by a technician utilizing a debug device), such as identifying and removing defects that prevent correct operation of the merchant terminal 110 and the various components thereof.

Merchant terminal 110 may also include a wired interface 216, which may include any suitable interface for wired communication, such as USB, Lightning, FireWire, Ethernet, any other suitable wired communication interface, or any combination thereof, to perform, for example, the wired communication with other devices of the payment system 100 and payment servers (e.g., via a secure internet connection).

Merchant terminal 110 may also include a wireless communication interface 218. The wireless communication interface 218 may include any suitable hardware and software for providing a wireless communication interface such as Bluetooth classic, Bluetooth low energy, WiFi, cellular, short message service (SMS), NFC, any other suitable wireless communication interface, or any combination thereof. In an example embodiment, the wireless communication interface 218 may facilitate communications between the merchant terminal 110 and peripherals, as well as with payment servers (e.g., via a secure internet connection).

Figure 3:
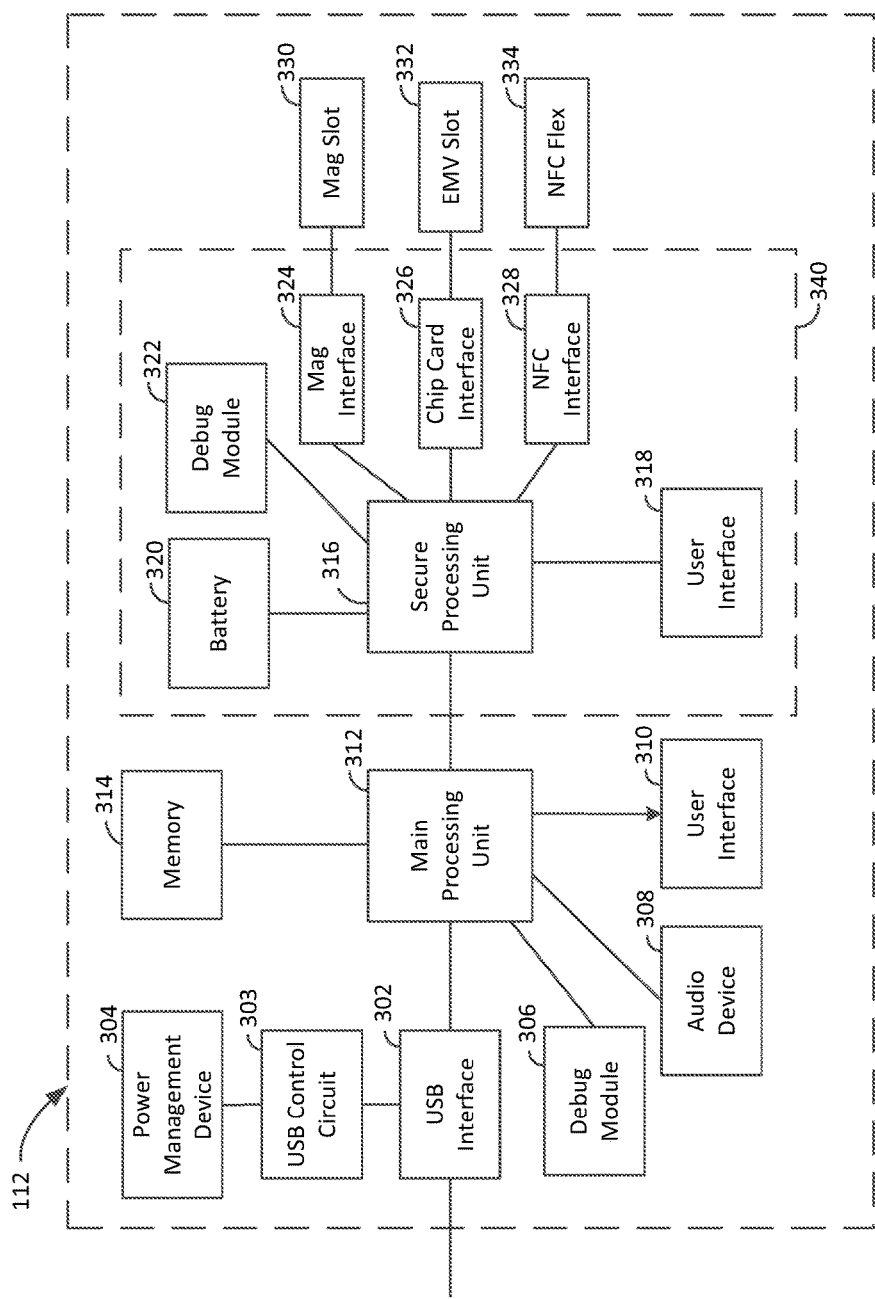
FIG. 3 depicts an illustrative block diagram of components of the customer terminal in accordance with some embodiments of the present disclosure.

FIG. 3 depicts a block diagram of an example customer terminal 112 in accordance with some embodiments of the present disclosure. Although particular components are depicted in a particular arrangement in FIG. 3, it will be understood that customer terminal 112 may include additional components, one or more of the components depicted in FIG. 3 may not be included in customer terminal 112, and the components of customer terminal 112 may be rearranged in any suitable manner. In one embodiment, customer terminal 110 may comprise a USB interface 302, a power management device 304, a debug module 306, an audio device 308, a user interface 310, a main processing unit 312, a memory 314, a secure enclave 340, a magnetic swipe slot 330, an EMV slot 332, and an NFC flex circuit 334.

Main processing unit 312 of customer terminal 112 may include a processor capable of performing the processing functions of the customer terminal 112 as described herein, and may be embodied by any suitable hardware, software, memory, and circuitry as is necessary to perform those functions. Main processing unit 312 may include any suitable number of processors, and may perform the operations of customer terminal 112 based on instructions in any suitable number of memories and memory types. In an example embodiment, the main processing unit 312 may be a System-on-Chip (SoC) processer having a dual-core processor (e.g., a Dual core ARM Cortex A7/A9).

Main processing unit 312 may execute instructions stored in memory 314 of customer terminal 112 to control the operations and processing of customer terminal 112, and the memory 314 may also store information necessary for the operation of customer terminal 112. In an example embodiment, memory 314 may include a flash memory and a RAM memory (e.g., a 16 GB eMMC NAND flash and a 2 GB LPDDR3 RAM).

USB interface 302 may provide for a connection to the merchant terminal 110 in order to receive power from merchant terminal 110 and to communicate with the merchant terminal 110. Although any type of USB connector and interface may be used in accordance with the present disclosure, in an embodiment USB interface 302 may be a USB type B receptacle for interfacing with a micro USB type B connector of a USB connector (e.g., USB connector 106 or 108, for connecting to merchant terminal 110). In some embodiments (not depicted in FIG. 3), customer terminal 112 may include additional wired or wireless interfaces such as additional USB ports, Lightning, Firewire, Ethernet, WiFi, Bluetooth, etc.

Although power may be provided to customer terminal 112 in any suitable manner, in an embodiment DC power may be provided from merchant terminal 110 when it is connected to the customer terminal 112 via the USB interface 302. A USB control circuit 303 may include circuitry for interacting with the merchant terminal 110 to receive the incoming DC power signal and to distribute that signal to other components of the customer terminal 112 (e.g., via power management device 304). In some embodiments, USB control circuit 303 may enable additional functionality, such as initiating a reprogramming mode for the customer terminal based on a received voltage at USB interface 302 (e.g., at an ID pin of USB interface 302). A power management device 304 (e.g., a discrete power management integrated circuit) may receive power provided from merchant terminal 110 through the USB interface 302 and USB control circuit 303, and may perform functions related to power requirements of the customer system (e.g., DC to DC conversion, battery charging, linear regulation, power sequencing and other miscellaneous system power functions).

Customer terminal 112 may also include a user interface 310. User interface 310 may provide various interfaces and outputs to the customer terminal 112 to be viewed by a customer. An example user interface 310 may include hardware and software for interacting with a customer, such as a touchscreen interface, voice command interface, keyboard, mouse, gesture recognition, any other suitable user interface, or any combination thereof. In one embodiment, the user interface 310 may be a touchscreen device that displays an interactive user interface for the customer to engage in purchase transactions (e.g., select items for purchase, answer queries, confirm purchases, provide PINs and signatures, etc.) at the customer terminal 112.

Customer terminal 112 may also include an audio device 308. Audio device 308 may provide audio for the customer terminal 112. An example audio device 308 may comprise an audio amplifier and a speaker for providing appropriate audio for the customer terminal 112.

Customer terminal 112 may also include a debug module 306. In an embodiment, a debug module 306 may provide an interface and processing for performing debug operations (e.g., by a technician utilizing a debug device), such as identifying and removing defects that prevent correct operation of the merchant terminal 110 and the various components thereof.

The secure enclave 340 may be a secure portion of the customer terminal 112 that performs critical functionality such as interacting with payment devices and cryptography, and that stores sensitive information such as cryptographic keys, passwords, and user information. In an embodiment, the secure enclave 340 may be located in a distinct location of the customer terminal 112 to isolate the secure enclave 340 from other circuitry of the customer terminal 112 and to allow protective measures (e.g., tamper detection switches, anti-tamper meshes, anti-tamper domes, isolated compartments, etc.) to be installed near and around the secure enclave 340 (not depicted in FIG. 3). In an example embodiment, the secure enclave 340 may be situated at a base of the customer terminal 112 in a manner that provides additional clearance for protective measures.

In an embodiment, the secure enclave 340 may include a secure processing unit 316, a user interface 318, a battery 320, a debug module 322, a magnetic swipe interface 324, a chip card interface 326, and an NFC interface 328.

Although secure processing unit 316 may be implemented with any suitable processor, hardware, software, or combination thereof, in an embodiment, secure processing unit 316 may be implemented as microcontroller such as the K21 microcontroller unit (MCU) supplied by Freescale Semiconductor, Inc. Secure processing unit 316 may perform transaction processing and cryptographic operations, based on instructions and information (e.g., customer data, encryption keys, etc.) stored in a memory of secure processing unit 316 (not separately depicted in FIG. 3), which may be any suitable memory as described herein. Secure processing unit 316 may communicate with main processing unit 312 in order to receive and respond to requests for processing of payment information. Communications may be performed using any suitable internal bus and communication technique (e.g., UART, SPI, I²C, and GPIO).

The secure enclave 340 of customer terminal 112 may also include a battery 320. In some embodiments, the battery 320 may function as a primary power source to certain components of the secure enclave 340 (e.g., memory storing critical payment, customer, and encryption information), such that when the battery power is removed the information is lost. The battery 320 may function in this manner in response to a tamper attempt, such that in response to the tamper attempt, the secured information is destroyed.

The secure enclave 340 of customer terminal 112 may also include a debug module 322. In an embodiment, a debug module 322 may provide an interface and processing for performing debug operations (e.g., by a technician utilizing a debug device) directly with the components of the secure enclave.

The secure enclave 340 of customer terminal 112 may also include a user interface 318. In an embodiment, user interface 318 (e.g., a keypad, touchscreen, etc.) may be located within the secure enclave such that certain content is provided to the secure enclave 340 rather than the general processing circuitry of the customer terminal 112. In this manner, critical information such as PIN numbers, signatures, and passwords may be provided only to the secure enclave 340 in the first instance, and then forwarded to the main processing unit 312 in encrypted or unencrypted form, as required.

Secure enclave 340 of customer terminal 112 may also include a magnetic swipe interface 324, chip card interface 326, and NFC interface 328. Each of these components may include interface circuitry for receiving and processing signals from a payment interface, such as a magnetic reader head 330, a chip card slot 332 (e.g., providing power and communications to the chip card), and an NFC circuit, components of which may be located on an NFC flex circuit 334 remote from secure enclave 340.

In an embodiment, if a secure enclave 340 is located at the base of the customer terminal 112, it may be desired for the NFC antenna and certain related circuitry (e.g., voltage boost circuitry, matching circuitry, EMC circuitry, and receive filters and amplifiers) to be located at a different location of the customer terminal 112 remote from the secure enclave 340, such as a NFC tap target area near the top center of the customer terminal.

Figure 4:
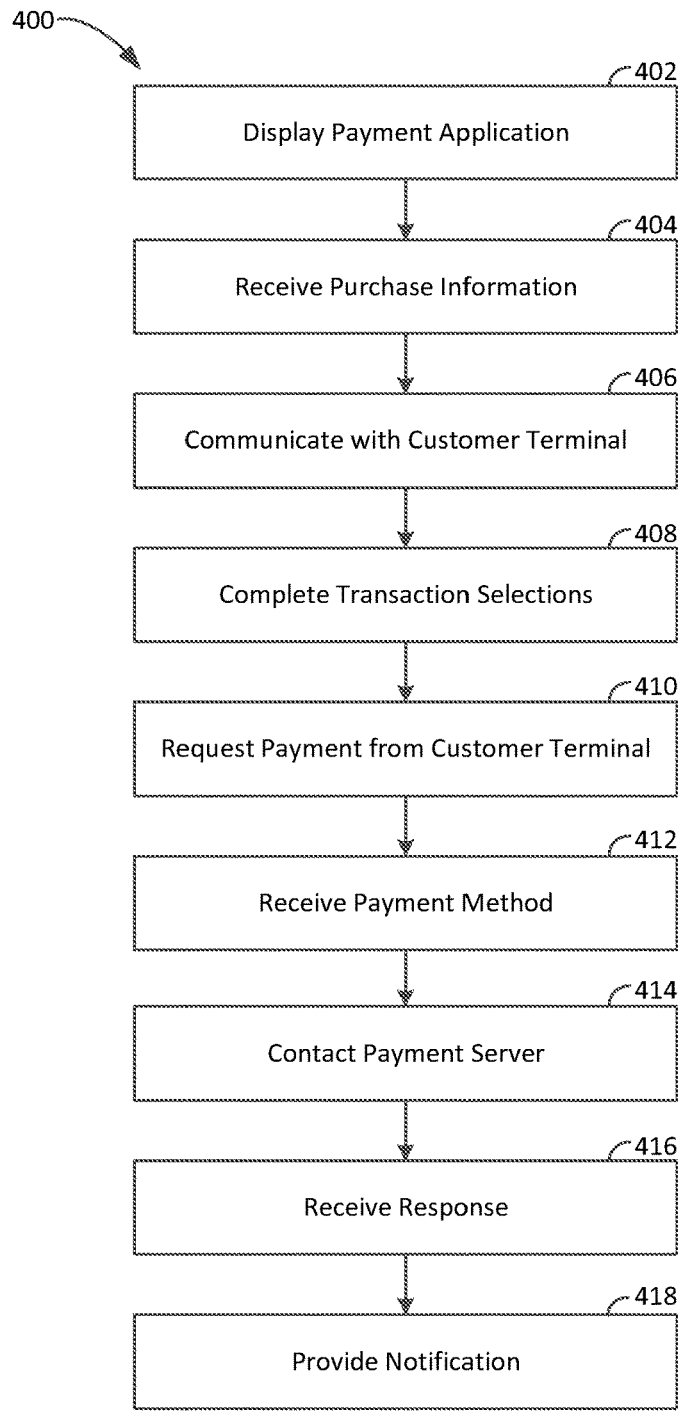
FIG. 4 depicts example steps for performing a payment transaction with a merchant terminal and a customer terminal in accordance with some embodiments of the present disclosure.

FIG. 4 depicts example steps 400 for performing a payment transaction with a merchant terminal 110 and a customer terminal 112 in accordance with some embodiments of the present disclosure. While, for purposes of simplicity of explanation, the methods described herein are shown and described as a series of steps, it is to be understood and appreciated that such illustrations or corresponding descriptions are not limited by the order of the steps, as some steps may occur in different orders and/or concurrently with other steps from what is depicted and described herein. Any non-sequential, or branched, flow illustrated via a flowchart should be understood to indicate that various other branches, flow paths, and orders of the steps, can be implemented which achieve the same or a similar result. Moreover, not all illustrated steps may be required to implement the methods described hereinafter.

At step 402, the point-of-sale application can be displayed at user interface 210 of merchant terminal 110. The point-of-sale application may display information such as items available for sale, specials, coupons, available inventory, combinations, and other similar information that may be used to guide a merchant user through a transaction. Processing may then continue to step 404.

At step 404, merchant terminal 110 may receive purchase information from the merchant interaction with the point of sale application of the user interface 210, such as selections of items for purchase, selections of optional purchases, and other information regarding a purchase. Once the purchase information has been received, processing may continue to step 406.

In some embodiments, at step 406, merchant terminal 110 may communicate with customer terminal 112 to perform a portion of the transaction steps. For example, a customer may interact with user interface 310 of customer terminal 112 to select items to purchase, select options, enter coupons, enter customer or loyalty information, confirm a purchase, or perform other similar tasks. Once the merchant terminal 110 and customer terminal 112 have completed any required communications, processing may continue to step 408.

At step 408, the merchant terminal 110 may complete the transaction selections based on the inputs and information received at steps 404 and 406 in order to initiate a check-out procedure. At this point in the transaction, required amounts such as tax and tip may be added to the purchase amount, such that the transaction may be completed. Processing may then continue to step 410.

At step 410, the merchant terminal 110 may provide a final payment amount to the customer terminal 412 and request that the customer provide a payment method. Information relating to the transaction and instructions may be provided to the customer at user interface 310 of the customer terminal 112. Processing may then continue to step 412.

At step 412, the customer terminal 112 may receive payment information from the customer via one of the magnetic stripe slot 330, chip card slot 332, or NFC antenna of NFC flex circuit 334. In some embodiments, user inputs such as PIN number, password, or signature may also be provided at user interface 318. The secure enclave 340 may process and encrypt the received payment information and provide it to merchant terminal 110. Processing may then continue to step 414.

At step 414, the merchant terminal 110 may contact a payment server or similar remote entity in order to determine whether the transaction is authorized. In an embodiment, the merchant terminal 110 may transmit the encrypted payment information as well as other information about the transaction to the payment via a communication interface such as wired interface 216 or wireless interface 218. Processing may then continue to step 416.

At step 416, merchant terminal 110 may receive a response from the payment server, such as an approval or denial of the transaction. Processing may then continue to step 418, at which notice of the approval or denial may be provided to the merchant and customer via user interface 210 of merchant terminal 110 and the customer via user interface 310 of customer terminal 112.

Figure 5:
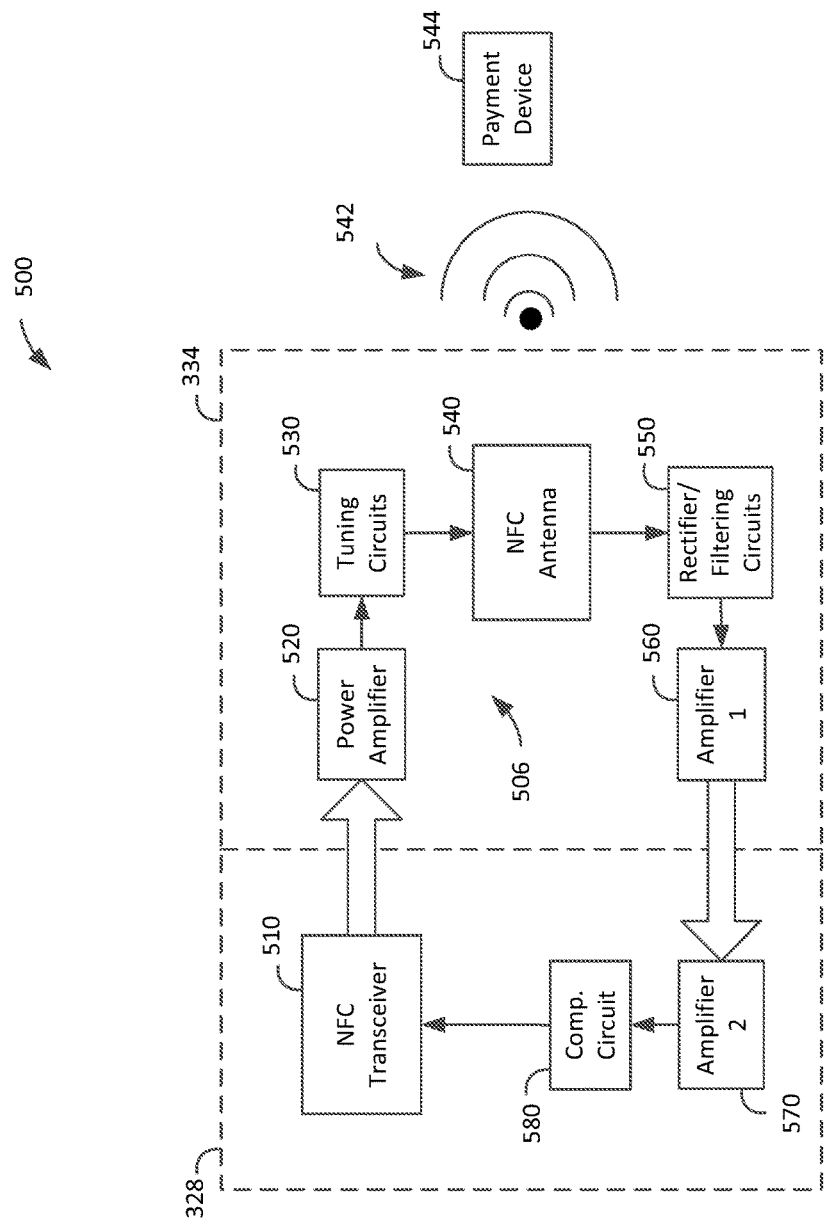
FIG. 5 depicts an illustrative block diagram of a near field communication (NFC) circuit in accordance with some embodiments of the present disclosure.

FIG. 5 depicts a block diagram of a near field communication (NFC) circuit 500 in accordance with some embodiments of the present disclosure. Although particular components are depicted in a particular arrangement in FIG. 5, it will be understood that NFC circuit 500 may include additional components, one or more of the components depicted in FIG. 5 may not be included in NFC circuit 500, and the components of NFC circuit 500 may be rearranged in any suitable manner. The NFC circuit 500 includes circuitry for generating and/or modulating a carrier signal to communicate with an NFC payment device 544. The NFC circuit 500 can have an NFC interface portion 328 connected to an NFC flex portion 334. As previously discussed in the disclosure, the NFC interface 328 can be part of the secure payments enclave 340 and can be located in the base of the customer terminal 112. In one embodiment, the components of the NFC interface 328 can be mounted on a printed circuit board (PCB), but can be mounted on other structures (e.g., a flex circuit) in other embodiments. The NFC flex 334 can be coupled to the NFC interface 328 and extend from the secure payment enclave 340 in the base of the customer terminal 112 to another location in the customer terminal 112, such as an NFC tap target area associated with the user interface 310. In one embodiment, the NFC flex 334 can extend to a top, center location of the customer terminal 112 such that the circuitry 506 of the NFC flex 334, including the NFC antenna 540, is located in a position to facilitate communication with an NFC payment device 544 carried by the customer.

The NFC payment device 544 may be an electronic device such as a smart phone, tablet, or smart watch that is capable of engaging in secure transactions with customer terminal 112 (e.g., via communications with NFC circuit 500). The NFC payment device 544 may have hardware (e.g., a secure element including hardware and executable code) and/or software (e.g., executable code operating on a processor in accordance with a host card emulation routine) for performing secure transaction functions. During a payment transaction, the NFC payment device 544 may be inductively coupled to NFC circuit 500 via a near field 542 and may communicate with customer terminal 112 by active or passive load modulation of a wireless carrier signal provided by NFC circuit 500 in accordance with one or more wireless communication standards such as ISO 14443 and ISO 18092. The NFC circuit 500 of customer terminal 112 can communicate information to the NFC payment device 544 by changing the amplitude and/or phase of the wireless carrier signal based on data to be transmitted from the customer terminal 112. In one embodiment, the NFC circuit 500 can emit a wireless carrier signal having a suitable frequency (e.g., 13.56 MHz) to generate the near field 542 for the NFC payment device 544. If the NFC payment device 544 has a suitably tuned antenna within the range of the near field 542 (e.g., 0 to 10 cm), the NFC payment device 544 receives the wireless carrier signal or wireless data signal that is transmitted by NFC circuit 500. In the case of a wireless data signal, processing circuitry of the NFC payment device 544 is able to demodulate the received signal and process the data that is received from the NFC circuit 500.

In one embodiment, the circuitry 506 of the NFC flex 334 can be located at an "electrically long" distance of between about 2 inches and about 10 or more inches from the NFC interface 328. The trace(s) (or line(s)) connecting the NFC interface 328 and the circuitry 506 of the NFC flex 334 can be considered "electrically long" when the distance travelled by the trace(s) is at least about 2.5% to about 5% or more of the propagation-medium-specific wavelength of the signal being transmitted on the trace(s) (e.g., a carrier signal from the NFC transceiver 510). In other words, if the length of the trace(s) connecting the NFC interface 328 and the circuitry 506 of the NFC flex 334 is between about $1/40^{th}$ and about $1/20^{th}$ or more of the wavelength of the signal being transmitted over the trace(s), then the connection between the NFC interface 328 and the NFC flex 334 can be considered "electrically long." Signals transmitted in an "electrically long" transmission line are susceptible to interference and/or degradation by improper impedance control and may also radiate energy that may impact other signals of the customer terminal. For example, transmission line effects may occur in an "electrically long" connection thereby resulting in reflections that distort the signal being transmitted in the trace.

The NFC interface 328 can include an NFC transceiver 510. In an embodiment, the NFC transceiver may receive data 502 such as payment messages to be transmitted via NFC communications. Based on the received data and modulation procedures, an outgoing data signal (e.g., a carrier signal modulated with payment data) may be communicated to the NFC flex 334 for transmission by the NFC antenna 540 to the payment device 544 via near field 542. The NFC interface 328 can also include a second amplifier circuit 570 that receives data from a first amplifier circuit 560 on the NFC flex 334. The second amplifier circuit 570 is coupled to a comparator circuit 580 that can digitize and provide an incoming digital signal to the NFC transceiver 510. In one embodiment, the NFC transceiver 510 can be coupled to the secure processing unit 316 via communication interfaces or buses (e.g., $I^2C$, SPI, UART, and GPIO) to receive data 502 (e.g., payment messages) to be transmitted and to provide data 502 (e.g., payment messages) to the secure processing unit 316.

The NFC flex 334 can include a power amplifier circuit 520 that receives a carrier signal or modulated digital signal from the NFC transceiver 510. The power amplifier circuit 520 is connected to tuning circuits 530 that tune the output of the power amplifier circuit 520 and provide the resulting signal to the NFC antenna 540 for transmission to the NFC payment device 544. The NFC antenna 540 can receive messages from the NFC payment device 544 and provide the received messages to rectifier/filtering circuits 550. The rectifier/filtering circuits 550 can remove the carrier signal from the received message and provide the data from the reply message to the first amplifier circuit 560, which communicates with the second amplifier circuit 570 as discussed above.

Figure 6:
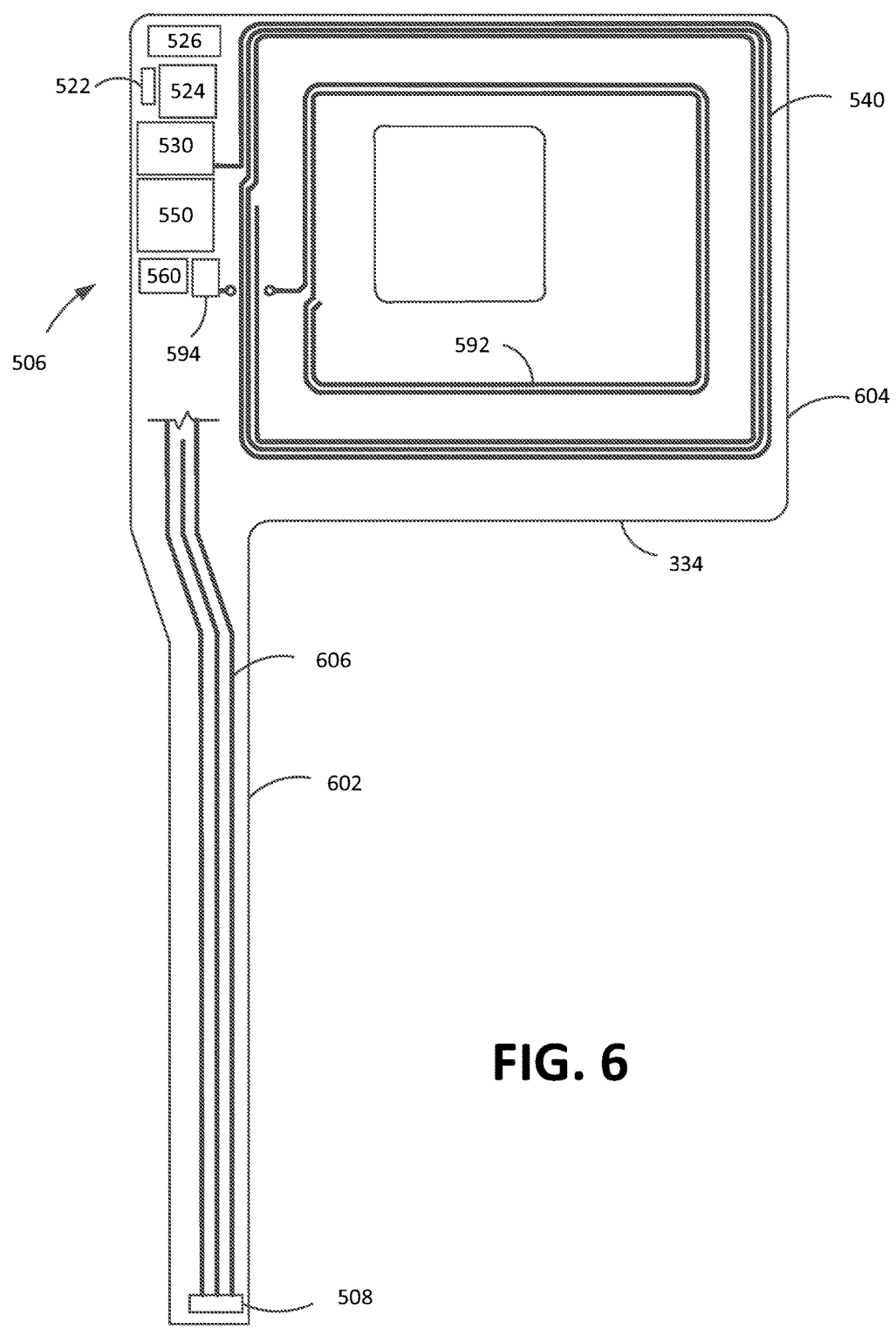
FIG. 6 depicts an illustrative schematic diagram of the flex circuit of the NFC circuit of FIG. 5 in accordance with some embodiments of the present disclosure.

FIG. 6 depicts a schematic diagram of the NFC flex 334 in accordance with some embodiments of the present disclosure. Although particular components are depicted in a particular arrangement in FIG. 6, it will be understood that NFC flex may include additional components, one or more of the components depicted in FIG. 6 may not be included in NFC flex 334, and the components of NFC flex 334 may be rearranged in any suitable manner. In one embodiment, NFC flex 334 is a flexible circuit, flex circuit or flexible printed circuit board that can have one or more layers (e.g., 3 layers) with traces and/or components on each of the layers. The NFC flex 334 can also provide for interconnections between the layers. While the NFC flex 334 of FIG. 6 shows all components and traces on a top surface of the NFC flex 334, it is to be understood that the components and/or traces may be located on other layers of the NFC flex 334.

The NFC flex 334 includes an interface 508 for coupling the NFC flex 334 and NFC interface 328. The interface 508 can be connected to the circuitry 506 by a plurality of traces (or lines) 606. It is to be understood that while 3 traces 606 are shown in FIG. 6, the number of traces 606 can be greater or less than the number shown in FIG. 6, depending on the number of terminals associated with interface 508 and the components of circuit 506 to be connected to interface 508. The interface 508 and traces 606 can be used to send and receive signals between the circuitry 506 of the NFC flex 334 and the NFC interface 328. In one embodiment, the interface 508 and traces 606 can be used to exchange a differential transmit signal, a receive signal, one or more power signals and one or more additional signals between the NFC interface 328 and the circuitry 506 of the NFC flex 334.

The NFC flex 334 can include a first portion 602 and a second portion 604. The interface 508 can be mounted on the first portion 602 near the NFC interface 328. The first portion 602 can be sized to be able accommodate the traces and/or lines connecting the interface 508 and the circuitry 506. In one embodiment, the first portion 602 can have a length that is greater than its width. The second portion 604 of the NFC flex 334 can be located near the top of the merchant terminal 112 and can be sized to incorporate the circuitry 506, including antenna 540. In one embodiment, the second portion 604 can have a larger width than the first portion 602 since the second portion has to have adequate space for antenna 540 and circuitry 506. The second portion 604 of the NFC flex 334 can include one or more additional layers (e.g., stiffener layers, ferrite layers and PSA layers) to provide additional rigidity to the second portion 604 for the mounting of the components of circuit 506 (including antenna 540). In one embodiment, the second portion 604 of the NFC flex 334 (or a portion thereof) can include a printed circuit board instead of a flexible circuit element.

In the embodiment shown in FIG. 6, the NFC flex 334 can include an auxiliary antenna 592 that is coupled to auxiliary circuitry 594. The auxiliary antenna 592 can be selectively switched on and off as necessary to modify the overall inductive load during NFC communications. In one embodiment, the auxiliary antenna 592 may be switched on during times when the NFC antenna 540 in NFC circuit 500 is not transmitting a modulated data signal, in order to modify the inductive load and assist in receiving a modified signal from the NFC payment device 544.

Figure 7:
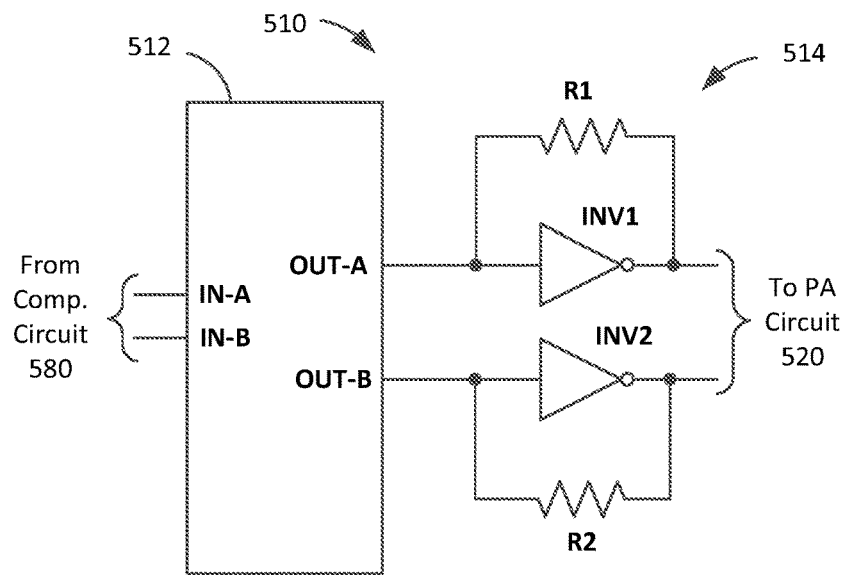
FIG. 7 depicts an illustrative schematic diagram of the NFC transceiver of the NFC circuit of FIG. 5 in accordance with some embodiments of the present disclosure.

FIG. 7 depicts a schematic diagram of an NFC transceiver 510 in accordance with some embodiments of the present disclosure. Although particular components are depicted in a particular arrangement in FIG. 7, it will be understood that the NFC transceiver 510 may include additional components, one or more of the components depicted in FIG. 7 may not be included in the NFC transceiver 510, and the components of NFC transceiver 510 may be rearranged in any suitable manner. The NFC transceiver 510 can include a processing device 512 and a drive circuit 514. The drive circuit 514 can be coupled to the power amplifier circuit 520 through interface 508 and the first portion 602 of the NFC flex 334. The processing device 512 can have two output terminals (OUT-A, OUT-B) to provide a differential, amplitude modulated, digital signal to the drive circuit 514. In one embodiment the differential, amplitude modulated digital signal can be either a wireless carrier signal or an outgoing modulated digital signal. A wireless carrier signal may be a signal having a fixed frequency such as 13.56 MHz, while the outgoing modulated digital signal may modify the wireless carrier in a suitable manner (e.g., amplitude modulation) in order to encode data onto the wireless carrier signal based on payment messages to be transmitted (e.g., based on data 502). The differential signal from the processing device 512 can have a positive signal on one line and a negative signal in the other line.

In one embodiment, the processing device 512 can be a field programmable gate array (FPGA) or other similar type of device, e.g., a microprocessor. The drive circuit 514 can include a resistor connected in parallel with an inverter for each of the lines used for the differential signal. As shown in FIG. 7, resistor R1 and inverter INV1 can be connected to terminal OUT-A and resistor R2 and inverter INV2 can be connected to terminal OUT-B. The resistors R1 and R2 and the inverters INV1 and INV2 can be selected to provide buffering capabilities and the desired drive and impedance characteristics for communicating with the power amplifier circuit 520 and to reduce or remove any transmission line effects that may occur during the communication of the differential, amplitude modulated, digital signal between the drive circuit 514 and the power amplifier circuit 520.

During periods when modulation is applied to the wireless carrier signal (i.e., transmit periods) based on the outputs from the processing device 512, a modulated wireless signal is output from the antenna 540. The modulated wireless signal varies from the wireless carrier signal in its amplitude, phase, or both in response to received payment messages (e.g., received as data 502). Processing device 512 may implement a modulation procedure in order to generate the modulated wireless signal, either alone or in combination with modulation circuitry. The modulated wireless signal is provided to the power amplifier circuit 520 and transmitted over antenna 540 (i.e., via drive circuit 514, interface 508, and traces 606) as a modulated wireless signal (representing data to be transmitted) during a transmit event. The processing device 512 can also provide a wireless carrier signal to the NFC flex 334 for transmission via the antenna 540 when data is not being transmitted from the processing device 512.

The processing device 512 may determine data from received signals by extracting a data signal from the signal provided to the processing device. As described herein, the various components within the receive path may provide an incoming digital data signal to the processing device (e.g., from comparator circuit 580). The processing device 512 may utilize information about a known encoding procedure to determine data from the digital data signal. The determined data may then be provided to other processing circuitry via communication interface as payment messages (e.g., as data 502).

Figure 8:
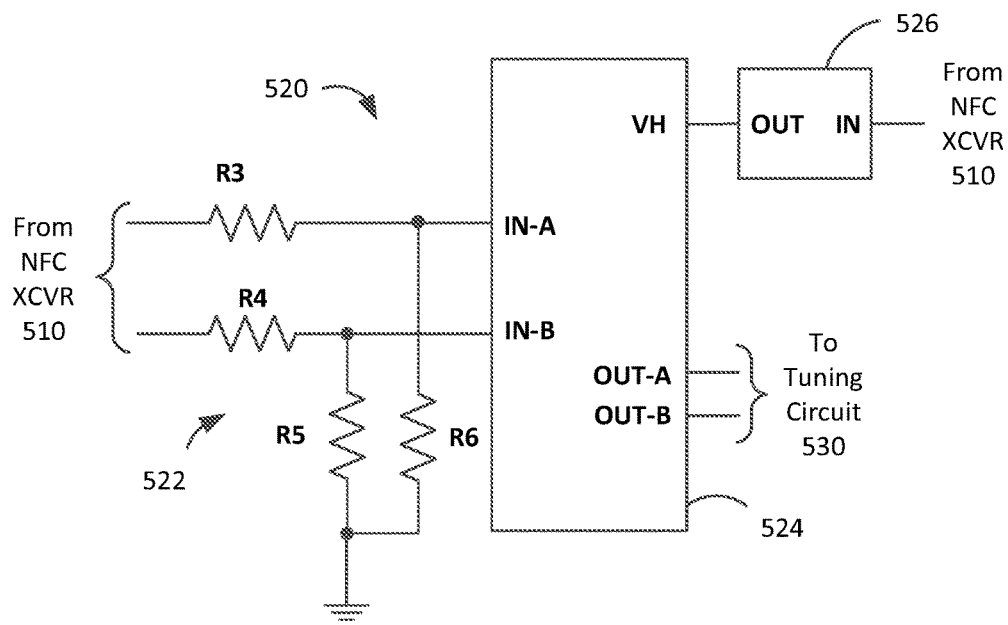
FIG. 8 depicts an illustrative schematic diagram of the power amplifier circuit of the NFC circuit of FIG. 5 in accordance with some embodiments of the present disclosure.

FIG. 8 depicts a schematic diagram of a power amplifier circuit 520 in accordance with some embodiments of the present disclosure. Although particular components are depicted in a particular arrangement in FIG. 8, it will be understood that the power amplifier 520 may include additional components, one or more of the components depicted in FIG. 8 may not be included in the power amplifier 520, and the components of the power amplifier 520 may be rearranged in any suitable manner. In an embodiment, the power amplifier circuit 520 can include a termination circuit 522 and an amplifier circuit 524.

Although the termination circuit may be configured in a variety of manners, in an embodiment, the termination circuit 522 can include a pair of resistors connected in parallel for each of the traces 606 used for the differential signal from the NFC transceiver 510. The output of the termination circuit 522 can be connected to terminals of the amplifier circuit 524. As shown in FIG. 7, resistors R3 and R6 can be connected to terminal IN-A of amplifier circuit 524 and resistors R4 and R5 can be connected to terminal IN-B of amplifier circuit 524. The configuration and values for components of the termination circuit 522 can be arranged to match the impedance of the traces 606 and/or interface 508 connecting the power amplifier circuit 520 and NFC transceiver 510, in order to reduce or remove any signal reflections that may occur at the power amplifier circuit 520 when receiving the outgoing modulated digital signal (e.g, the differential, amplitude modulated, digital signal) from the drive circuit 514. The resistors R3-R6 can be selected to match the impedance of the lines connected to the power amplifier circuit 520 (e.g., the traces 606 in the first portion 602 of the NFC flex 334).

The amplifier circuit 524 can be used to convert the outgoing modulated digital signal to a modulated analog signal and to boost the amplitude (voltage) of the analog signal. In one embodiment, the amplifier circuit can include an H-Bridge circuit. The analog signal output from the amplifier circuit 524 can include the desired data signal and carrier frequencies, and, in some instances, one or more harmonic frequencies. The amplifier circuit 524 can boost the amplitude of the analog signal based on a low drop out (LDO) signal received at terminal VH from an LDO circuit 526. The LDO circuit 526 can receive a buck signal of about 5 V to about 10 V from the NFC interface 328. The LDO circuit 526 can include a voltage regulator to adjust the buck signal from the NFC interface 528 to a desired voltage for the amplifier circuit 524 (e.g., 50 volts). The amplifier circuit 524 can then use the signal from the LDO circuit 526 in establishing the amplitude of the analog signal provided by the amplifier circuit 524.

Figure 9:
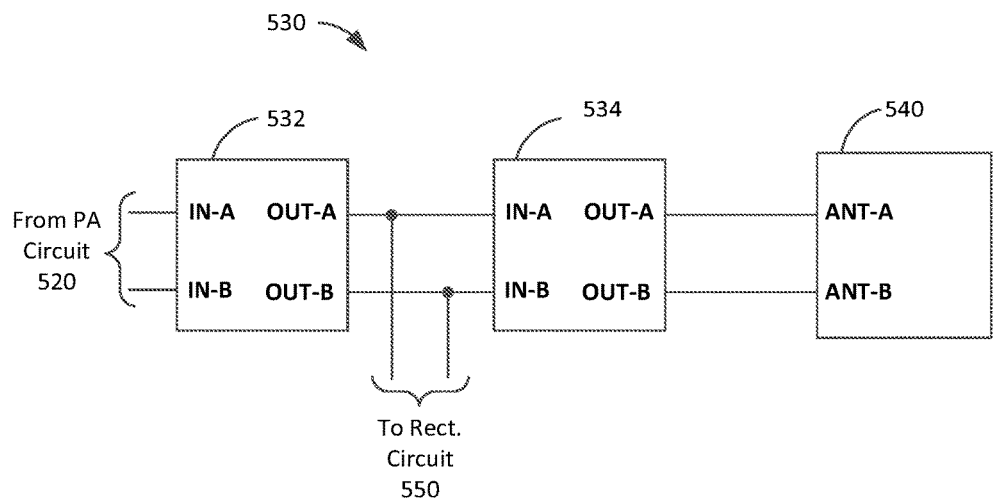
FIG. 9 depicts an illustrative schematic diagram of the tuning circuits and antenna of the NFC circuit of FIG. 5 in accordance with some embodiments of the present disclosure.

FIG. 9 depicts a schematic diagram of the tuning circuit 530 and antenna 540 in accordance with some embodiments of the present disclosure. Although particular components are depicted in a particular arrangement in FIG. 9, it will be understood that the tuning circuit 530 may include additional components, one or more of the components depicted in FIG. 9 may not be included in the tuning circuit 530, and the components of the tuning circuit 530 may be rearranged in any suitable manner. In one embodiment, the tuning circuit 530 can remove harmonics from the differential analog signal received from the power amplifier circuit 520. The differential analog signal (e.g., the wireless carrier signal and/or modulated wireless signal) from tuning circuit 530 is then transmitted over antenna 540. The tuning circuit 530 can include an electromagnetic compatibility (EMC) circuit 532 and a matching circuit 534.

The differential analog signal from the power amplifier circuit 520 can be provided to EMC circuit 532. In some embodiments, EMC circuit 532 may include an electromagnetic interference (EMI) filter for suppressing interference experienced by NFC circuit 500, and may include one or more components such as inductors and/or capacitors in order to provide acceptable electromagnetic compatibility with other high-frequency signals. The output of EMC circuit 532 may be provided to matching circuit 534. Matching circuit 534 may include suitable components such as resistors, inductors, and capacitors to provide for impedance matching and tuning of antenna 540. In one embodiment, the components of EMC circuit 532 and matching circuit 534 (e.g., resistors, inductors, and capacitors) modify the output waveform of the wireless carrier signal. In other embodiments, the tuning circuit 530 and/or power amplifier 520 can operate as a transmit load for the antenna 540. When transmitting the wireless carrier signal or modulated wireless signal, the signal characteristics and inductive coupling of antenna 540 are based on this transmit load.

Figure 10:
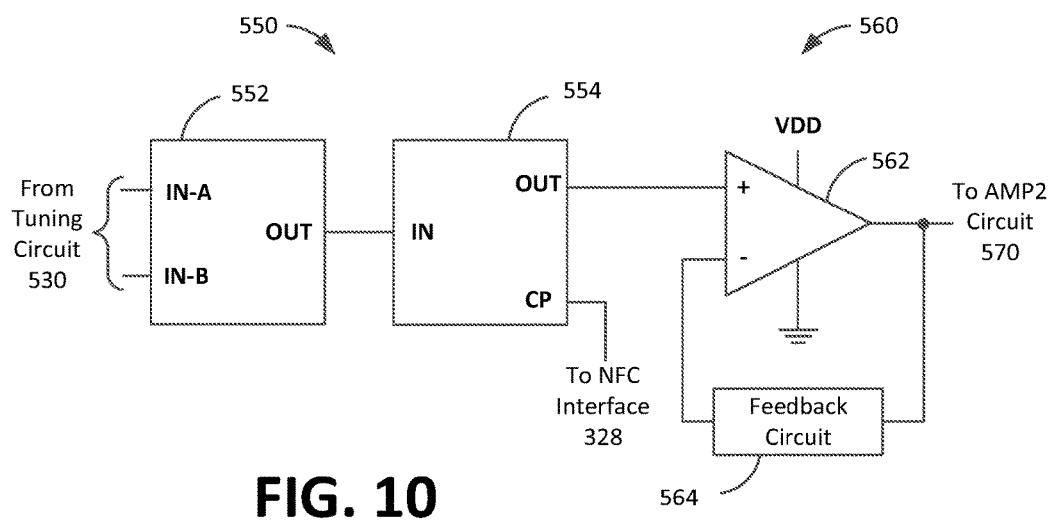
FIG. 10 depicts an illustrative schematic diagram illustrating the rectifier/filtering circuits and first amplifier circuit of the NFC circuit of FIG. 5 in accordance with some embodiments of the present disclosure.

FIG. 10 depicts a schematic diagram illustrating the rectifier/filtering circuits and first amplifier circuit in accordance with some embodiments of the present disclosure. Although particular components are depicted in a particular arrangement in FIG. 10, it will be understood that the rectifier/filtering circuit 550 and first amplifier 560 may include additional components, one or more of the components depicted in FIG. 10 may not be included in the rectifier/filtering circuit 550 and first amplifier 560, and the components of the rectifier/filtering circuit 550 and first amplifier 560 may be rearranged in any suitable manner. The rectifier/filtering circuit 550 can receive and process a received signal from the antenna 540 (e.g., a modulated signal provided by payment device 544), and may include a rectifier 552 and a filter 554. The first amplifier 560 can include an operational amplifier 562 with a feedback circuit 564.

The rectifier 552 can receive a differential, modulated analog signal from antenna 540 and the matching circuit 534 during a receive event. The rectifier 552 can remove the carrier signal from the differential, modulated analog signal received by antenna 540 and provide a demodulated analog data signal to the filter 554. In one embodiment, the rectifier 552 can include 4 diodes arranged in a bridge configuration (bridge rectifier). The filter 554 can include an envelope detector that is centered on the frequency of the data signal from the rectifier 552 and can provide a "card proximity" signal to the NFC interface 328 that corresponds to an estimated distance between the NFC antenna 540 and the payment device 544. The card proximity signal can be used to adjust the transmit power when attempting to communicate with the payment device 544. In one embodiment, the filter 554 can include suitable components such as resistors, inductors, diodes and capacitors to generate the card proximity signal and perform the envelope detection operation.

The operational amplifier 562 and feedback circuit 564 can provide an analog data signal having a lower frequency and lower amplitude to the second amplifier circuit 570. The analog data signal provided by the operational amplifier 562 and feedback circuit 564 can have a lower frequency since the frequency of the data signal can be less than the frequency of the carrier signal that has been removed by the rectifier 552. The operational amplifier 562 and feedback circuit 564 can drop the gain of the analog data signal from the filter 554 and act as a buffer for the data signal. In addition, the operational amplifier 562 and feedback circuit 564 can provide low source impedance when communicating the analog data signal to the second amplifier 570, which can have high termination impedance. In one embodiment, the feedback circuit 564 can include suitable components such as resistors and capacitors to generate the desired output from the operational amplifier 562.

Figure 11:
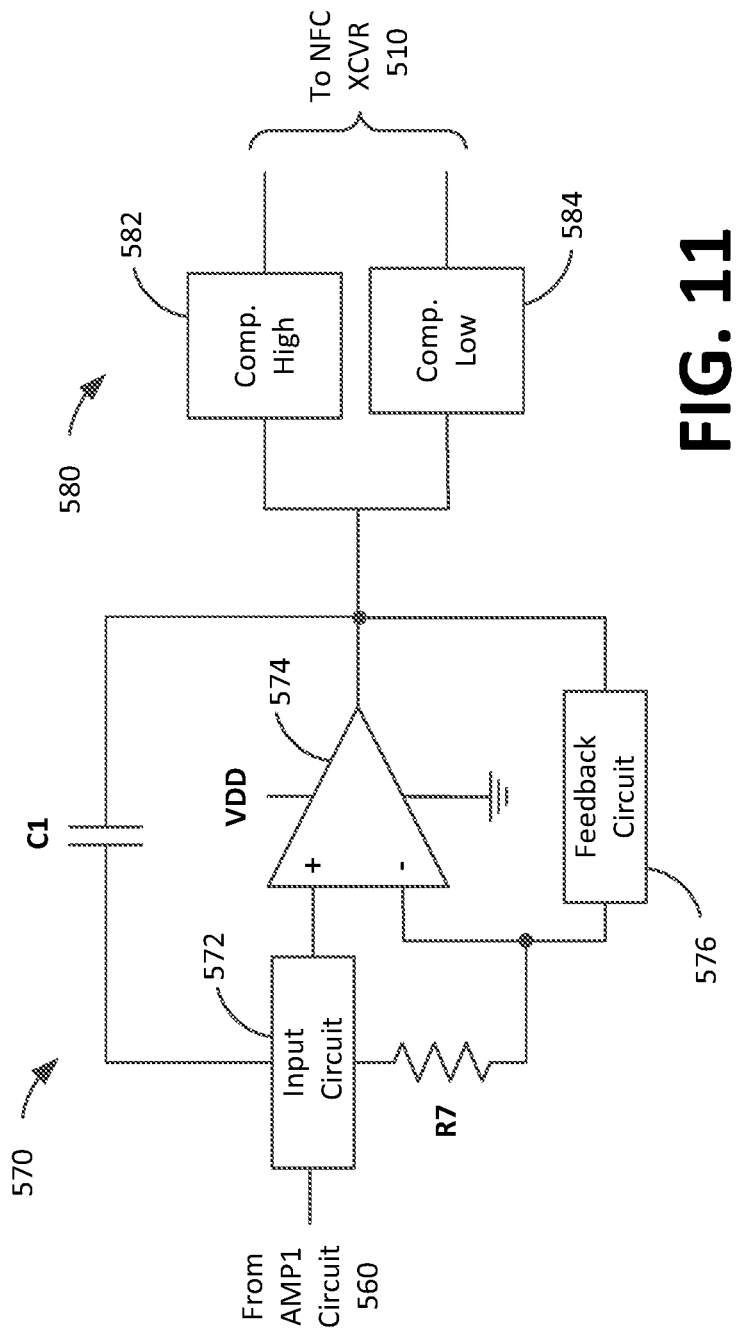
FIG. 11 depicts an illustrative schematic diagram of the second amplifier circuit and comparator circuit of the NFC circuit of FIG. 5 in accordance with some embodiments of the present disclosure.

FIG. 11 depicts a schematic diagram of the second amplifier circuit and comparator circuit in accordance with some embodiments of the present disclosure. Although particular components are depicted in a particular arrangement in FIG. 11, it will be understood that the second amplifier circuit 570 and the comparator 580 may include additional components, one or more of the components depicted in FIG. 11 may not be included in the second amplifier circuit 570 and the comparator 580, and the components of the second amplifier circuit 570 and the comparator 580 may be rearranged in any suitable manner. The second amplifier circuit 570 can include an input circuit 572, an operational amplifier 574 and a feedback circuit 576. The comparator 580 can include a comparator high circuit 582 and a comparator low circuit 584.

The second amplifier circuit 570 can receive the analog data signal from the first amplifier circuit 560 and can provide the desired gain to the analog data signal from the first amplifier circuit for subsequent processing by the comparator 580 and NFC transceiver 510. The second amplifier circuit 570 can include an input circuit 572 that can operate as a high pass filter on the analog data signal. The feedback circuit 576 can be coupled to the input circuit 572 by resistor R7 and the input circuit 572 can also receive feedback from the output of the operational amplifier 574 via capacitor C1. The input circuit 572 and the feedback circuit 576 may include suitable components such as resistors, inductors, and capacitors to provide for the desired filtering effects and output from the operational amplifier 574.

The comparator circuit 580 can receive the amplified analog data signal from the operational amplifier 574 and generate an incoming digital data signal for NFC transceiver 510. Each of the comparator high circuit 582 and the comparator low circuit 584 can receive the output from the operational amplifier 574 and provide a corresponding input to the processing device 512, based on the relative comparator values (high and low) of the two comparators and the input signal. The comparator high circuit 582 and the comparator low circuit 584 may each include suitable components such as resistors, inductors, and capacitors to generate the desired digital data signals for the processing device 512.

The foregoing is merely illustrative of the principles of this disclosure and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

As a further example, variations of apparatus or process parameters (e.g., dimensions, configurations, components, process step order, etc.) may be made to further optimize the provided structures, devices and methods, as shown and described herein. In any event, the structures and devices, as well as the associated methods, described herein have many applications. Therefore, the disclosed subject matter should not be limited to any single embodiment described herein, but rather should be construed in breadth and scope in accordance with the appended claims.

What is claimed is:

1. A customer terminal for processing payment information received via near-field communications (NFC) from a NFC payment device, the customer terminal comprising:
   a customer terminal circuit board comprising:
      a processing element configured to send outgoing payment messages and receive incoming payment messages, wherein the processing element is further configured to process the payment information based on the outgoing and incoming payment messages;
      a NFC transceiver in communication with the processing element to receive the outgoing payment messages from the processing element, modulate the data based on a carrier signal to generate an outgoing modulated digital signal, receive an incoming digital signal, and process the incoming digital signal to generate the incoming payment messages;
      an NFC receive circuit, wherein the NFC circuit comprises:
         an amplifier circuit configured to amplify an analog data signal; and
         a comparator configured to receive the amplified analog data signal from the amplifier circuit, and to digitize the amplified analog data signal to generate the incoming digital signal; and
      a NFC flex circuit, wherein at least a portion of the NFC flex circuit comprises flexible circuit elements, the NFC flex circuit comprising:
         a NFC transmission circuit, comprising:

a power amplifier configured to receive the outgoing modulated digital signal from the NFC transceiver and to amplify the outgoing modulated digital signal to output an outgoing modulated analog signal;
a tuning circuit coupled to the power amplifier to tune the outgoing modulated analog signal to generate a tuned outgoing signal; and
an antenna configured to transmit the tuned outgoing signal and to receive an inductively coupled signal;
a flex amplifier circuit configured to receive the inductively coupled signal from the antenna and amplify the inductively coupled signal to output the analog data signal;
one or more transmit traces coupled to the customer terminal circuit board and the NFC transmission circuit, wherein the outgoing modulated digital signals are transmitted from the NFC transceiver to the power amplifier via the one or more transmit traces; and
a receive trace coupled to the customer terminal circuit board and the flex amplifier circuit, wherein the analog data signal is provided from the flex amplifier circuit to the NFC receive circuit via the receive trace, wherein the one or more transmit traces and the receive trace are flexible circuit elements, and wherein the one or more transmit traces and the receive trace extend a predetermined distance between the customer terminal circuit board and the NFC transmission circuit and the flex amplifier circuit, wherein the predetermined distance is at least 2.5% of the propagation-medium-specific wavelength of the carrier signal.

2. The customer terminal of claim 1, wherein the NFC flex circuit further comprises a termination circuit to match an impedance of the one or more transmit traces, the termination circuit coupled to the one or more transmit traces and the power amplifier.

3. The customer terminal of claim 1, wherein the customer terminal circuit board further comprises at least one inverter to drive the outgoing modulated digital signal from the NFC transceiver, the at least one inverter being coupled to the one or more transmit traces and the NFC transceiver.

4. The customer terminal of claim 1, wherein the NFC flex circuit further comprises a rectifier/filtering circuit to remove the carrier signal from the inductively coupled signal from the antenna, the rectifier/filtering circuit being coupled to the antenna and the flex amplifier circuit.

5. A terminal to engage in near-field communications (NFC) with a device, the terminal comprising:
a base and a target area for NFC communications;
a NFC circuit to send and receive NFC messages, the NFC circuit comprising:
a first portion located in the base and a second portion located adjacent to the target area, the first portion being coupled to the second portion by a flexible circuit element;
the first portion of the NFC circuit comprising:
a NFC transceiver to generate an outgoing modulated digital signal and receive an incoming digital signal; and
a NFC receive circuit configured to amplify an analog data signal and to digitize the analog data signal to generate the incoming digital signal for the NFC transceiver;
the second portion of the NFC circuit comprising:

a NFC transmission circuit to receive the outgoing modulated digital signal and to generate a tuned outgoing signal;
an antenna configured to transmit the tuned outgoing signal and to receive an inductively coupled signal; and
a receive amplifier configured to receive the inductively coupled signal from the antenna and amplify the inductively coupled signal to output the analog data signal.

6. The terminal of claim 5, wherein the second portion of the NFC circuit is mounted on a flexible circuit element.

7. The terminal of claim 5, wherein the flexible circuit element includes one or more traces to communicate signals between the first portion of the NFC circuit and the second portion of the NFC circuit, the one or more traces extending a predetermined distance greater than 2 inches.

8. The terminal of claim 7, wherein the predetermined distance is at least 2.5% of the propagation-medium-specific wavelength of a carrier signal used in the outgoing modulated digital signal.

9. The terminal of claim 5, wherein the NFC transmission circuit comprises:
a power amplifier configured to receive the outgoing modulated digital signal and to amplify the outgoing modulated digital signal to output an outgoing modulated analog signal; and
a tuning circuit coupled to the power amplifier to tune the outgoing modulated analog signal to generate the tuned outgoing signal.

10. The terminal of claim 9, wherein the NFC transmission circuit comprises a termination circuit coupled to the power amplifier to match an impedance of the flexible circuit element coupling the first portion of the NFC circuit and the second portion of the NFC circuit.

11. The terminal of claim 9, wherein the NFC transmission circuit comprises a low drop out circuit coupled to the power amplifier to adjust an input voltage provided to the power amplifier, wherein an amplitude of the outgoing modulated analog signal is based on the input voltage.

12. The terminal of claim 9, wherein the tuning circuit comprises an electromagnetic compatibility circuit to provide electromagnetic compatibility with other high-frequency signals and a matching circuit to provide for impedance matching and tuning of the antenna.

13. The terminal of claim 5, wherein the target area is adjacent to a touchscreen device of the terminal.

14. The terminal of claim 5, wherein the NFC receive circuit comprises:
a second receive amplifier configured to amplify the analog data signal; and
a comparator configured to receive the amplified analog data signal, and to digitize the amplified analog data signal to generate the incoming digital signal.

15. The terminal of claim 5, wherein the first portion of the NFC circuit comprises at least one inverter coupled to the NFC transceiver to drive the outgoing modulated digital signal from the NFC transceiver.

16. The terminal of claim 5, wherein the second portion of the NFC circuit comprises a second NFC receive circuit coupled to the receive amplifier to remove a carrier signal from the inductively coupled signal from the antenna.

17. The terminal of claim 16, wherein the second NFC receive circuit comprises a rectifier circuit and a filtering circuit.

18. The terminal of claim 5, wherein the outgoing modulated digital signal is a differential signal having a positive signal and a negative signal.

19. The terminal of claim 5, wherein the first portion of the NFC circuit is mounted on a printed circuit board.

20. A method of exchanging messages between a terminal and a device via near-field communications (NFC), the method comprising:
- generating an outgoing message for the device with a processing element of the terminal;
- modulating, with a NFC transceiver of the terminal, the outgoing message based on a carrier signal to generate an outgoing modulated digital signal;
- communicating the outgoing modulated digital signal over at least one transmit trace of a flex circuit of the terminal to an NFC transmission circuit of the terminal;
- generating, with the NFC transmission circuit, an outgoing modulated analog signal based on the received outgoing modulated digital signal;
- transmitting, with an antenna of the terminal, the outgoing modulated analog signal to the device;
- receiving, at the antenna, an inductively coupled signal from the device;
- generating, with a first NFC receive circuit of the terminal, an analog data signal based on the inductively coupled signal;
- communicating, over at least one receive trace of the flex circuit, the analog data signal to a second NFC receive circuit;
- generating, with the second NFC receive circuit, an incoming digital signal based on the analog data signal;
- processing the incoming digital signal to generate an incoming message with the NFC transceiver; and
- receiving the incoming message at the processing element.

21. The method of claim 20, further comprising:
- coupling the NFC transceiver and the NFC transmission circuit with the at least one transmit trace; and
- coupling the first NFC receive circuit and the second NFC receive circuit with the at least one receive trace.

22. The method of claim 20, wherein generating an outgoing modulated analog signal comprises:
- amplifying the outgoing modulated digital signal with a power amplifier to output an outgoing modulated analog signal;
- tuning the outgoing modulated analog signal with a tuning circuit to generate a tuned outgoing signal; and
- providing the tuned outgoing signal to the antenna.

23. The method of claim 20, further comprising matching an impedance of the at least one transmit trace with a termination circuit coupled to the NFC transmission circuit.

24. The method of claim 20, wherein generating an incoming digital signal comprises:
- amplifying the analog data signal with a receive amplifier to generate an amplified analog data signal; and
- digitizing the amplified analog data signal with a comparator to generate the incoming digital signal.

25. The method of claim 20, further comprising driving the outgoing modulated digital signal from the NFC transceiver with at least one inverter.

26. The method of claim 20, wherein generating an analog data signal comprises removing, with a rectifier circuit, a carrier signal from the inductively coupled signal from the antenna to generate a demodulated signal.

27. The method of claim 26, wherein generating an analog data signal further comprises amplifying, with an amplifier, the demodulated signal to output the analog data signal.

28. The method of claim 20, wherein the at least one receive trace has a predetermined distance of at least 2.5% of the propagation-medium-specific wavelength of the carrier signal, and wherein the at least one transmit trace has a predetermined distance of at least 2.5% of the propagation-medium-specific wavelength of the carrier signal.

\* \* \* \* \*